C. T. HENDERSON.
MOTOR CONTROLLER.
APPLICATION FILED SEPT. 29, 1909.
1,172,705.
Patented Feb. 22, 1916.
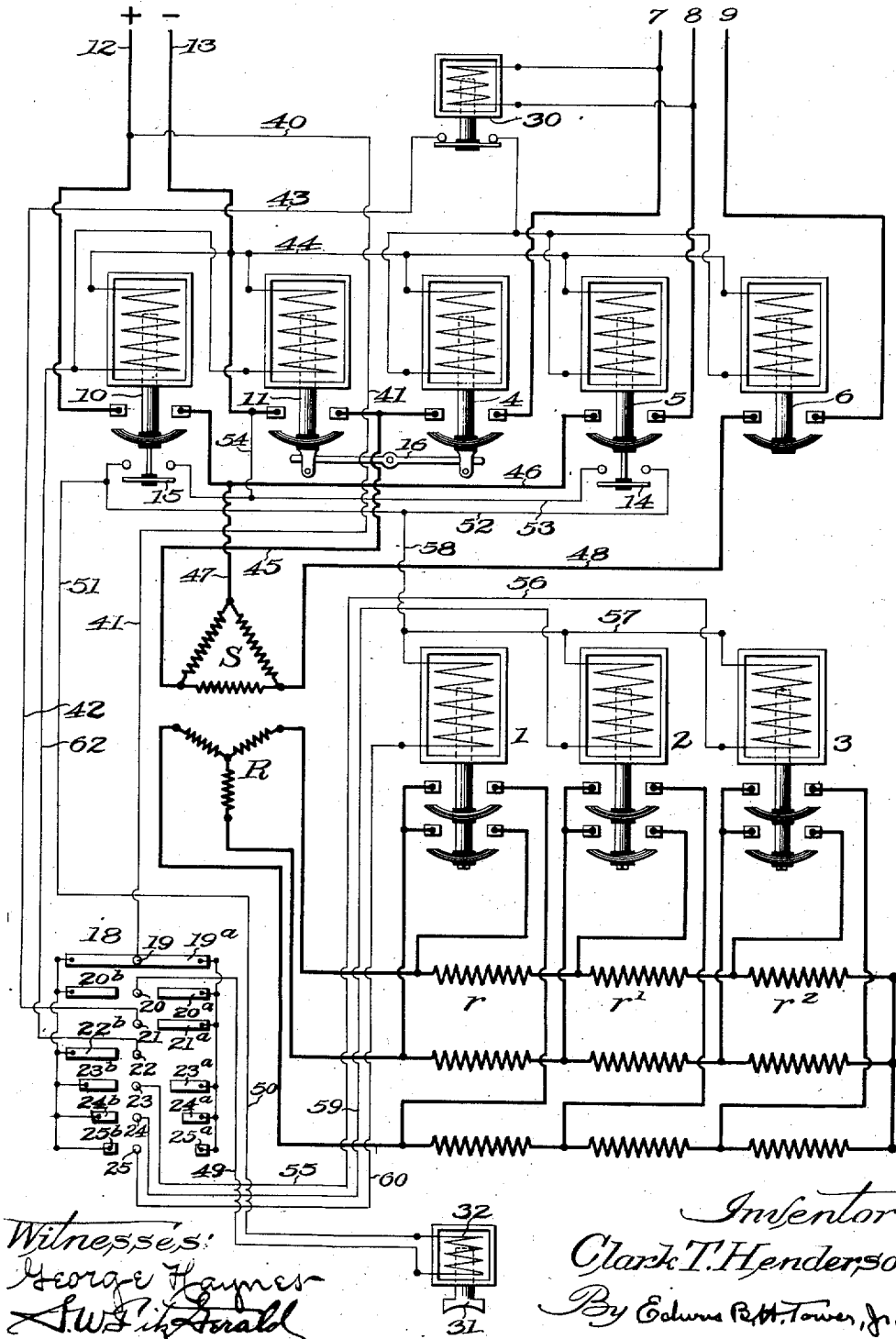
Inventor:
Clark T. Henderson.
By Edwin B. H. Tower, Jr.
Attorney.
Witnesses:
George Haynes
S. W. FitzGerald

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,172,705.

Specification of Letters Patent.   Patented Feb. 22, 1916.

Application filed September 29, 1909. Serial No. 520,128.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in controllers for electric motors, and more particularly to alternating current motors, especially those of the slip ring or wound rotor type.

In practice, there are many instances where slip ring motors could be used to advantage if the same could be made to efficiently perform dynamic braking. To be efficient in this respect, the motor must be capable of generating a dynamic braking current when operating at a slow speed as well as at a high speed. However, owing to the inherent characteristics of induction motors, they are not changed from motors to generators unless driven above synchronism, or, in other words, at a high speed. Consequently, such motors have heretofore been found impractical for dynamic braking purposes.

Broadly, my invention has for its object to provide means for rendering this class of motors perfectly efficient and satisfactory for dynamic braking purposes.

Further, my invention has for its object to provide means for enabling regulation of the dynamic braking action of the motor.

Various other objects and advantages of my invention will be hereinafter fully and clearly set forth.

In order to more fully disclose the nature and characteristic features of my invention, I shall describe the controller diagrammatically illustrated in the accompanying drawing.

It should be understood that my invention is not limited to the particular controller illustrated, but is susceptible of various modifications, and that in the controller illustrated certain features, which would be embodied therein in practice, have been omitted for the purpose of simplifying the diagram thereof.

In the drawing, I have diagrammatically illustrated a slip ring motor as provided with a stator S and a rotor R. The motor illustrated is of a three phase type, but it should be understood that my invention is applicable to other than three phase motors. Connected in each phase of the rotor circuit are a plurality of resistance sections $r$, $r'$ and $r^2$, which, as will be hereinafter set forth, are employed for starting purposes and also for regulation of the dynamic braking current. Of course, more or less resistance sections could be included in each phase of the rotor circuit as desired. For controlling the resistances mentioned, I have provided electromagnetically operated switches 1, 2 and 3, each arranged to short circuit one section of resistance from each phase of the rotor circuit. For connecting the stator to a suitable source of alternating current, I have shown electromagnetically operated switches 4, 5 and 6. The switches 4, 5 and 6 are arranged to connect different taps on the stator winding to the conductors 7, 8 and 9 respectively of a three phase supply circuit.

As will be hereinafter more fully set forth, for causing the motor to act as a dynamic brake, I connect the stator to a source of direct current. For this purpose, I have illustrated switches 10 and 11, which are adapted to respectively connect two taps on the stator winding to main lines 12 and 13 of a direct current supply circuit. The switches 5 and 10 are provided with auxiliary switch contacts 14 and 15 respectively for a purpose to be hereinafter set forth. The switches 4 and 11 are preferably interlocked by suitable means such as a lever 16 to prevent either of the same from being closed until after the other has opened. This insures disconnection of the stator from one circuit prior to connection to the other supply circuit.

In practice, the operating windings of the several switches may be supplied with either direct or alternating current, but, in practice, I prefer to connect the same to the direct current supply circuit, and have so illustrated the same. The circuits of the operating windings of the several switches may, in practice, be controlled in any preferred manner; but, for the purpose of illustration, I have diagrammatically shown a master controller 18 therefor. As illustrated, the master controller 18 comprises contact fingers 19 to 25 inclusive, arranged to be engaged by either one or two sets of contact segments according to the direction in which the controller is moved. As illustrated, the contact fingers are disposed between the two sets of contact segments. The upper contact segment 19$^a$ is common to both sets of segments and remains in continuous engagement with the contact finger 19. The remaining contact segments on the right hand side of the series of contact fingers I shall designate as 20$^a$, 21$^a$, 23$^a$, 24$^a$ and 25$^a$, and those on the left hand side as 20$^b$, 22$^b$, 23$^b$, 24$^b$ and 25$^b$. The several contact segments of each set are electrically connected to one another and certain segments of each set vary in length for the purpose hereinafter set forth.

In addition to the switches above mentioned, I have shown a relay switch 30, having an operating winding connected across one phase of the alternating current supply circuit. As will be hereinafter more clearly set forth, the switch 30 is adapted, upon failure of voltage in the alternating current supply circuit, to interrupt the circuits of certain of the switches before mentioned for protective purposes.

In addition to the dynamic brake afforded by the motor, I prefer to provide a mechanical brake 31, arranged to be applied to the motor shaft or to the mechanism driven thereby. For withholding the mechanical brake 31, I have provided an electromagnetic winding 32, which, as will be hereinafter set forth, is also controlled by the master switch 18.

I shall now describe the operation of the controller illustrated, at the same time clearly setting forth the circuit connections therefor. With the several switches in the position shown, when it is desired to start the motor, the master controller should be moved into such a position as to cause the right hand set of contact segments to engage the contact fingers. Upon initial movement of the master controller in such a direction, circuit is first closed from main line 12 of the source of direct current supply, by conductors 40 and 41 to contact finger 19 of the master controller, to contact segment 19$^a$ thereof, to contact segment 21$^a$ and contact finger 21, by conductors 42 and 43, through the relay switch 30 and thence through the operating windings of switches 4, 5 and 6 in parallel, by conductor 44 to D. C. main line 13. Thereupon the switches 4, 5 and 6 close, thereby connecting the stator of the motor to the source of alternating current. More specifically, closure of the switch 4 connects conductor 7 of the source of alternating current to conductor 45, which, in turn, is connected to one tap on the stator winding. Switch 5 connects conductor 8 to conductors 46 and 47, the latter of which is connected to another tap on the stator winding; and switch 6 connects conductor 9 to conductor 48 which is connected to the third tap on the stator winding. Upon closure of the switch 5, the auxilary switch 14 thereof is moved into closed position, thereby completing a circuit from contact segment 19$^a$ of the master controller to contact segment 20$^a$ and contact finger 20, by conductor 49, through the brake coil 32, by conductors 50, 51 and 52, through said auxiliary switch 14 of switch 5, by conductors 53 and 54 to D. C. main line 13. Thereupon the mechanical brake 31 is withdrawn, and, consequently, the motor is permitted to start. At this time, however, all resistance is included in the rotor circuit inasmuch as the switches 1, 2 and 3 are in open position. To remove the resistance from the rotor circuit to accelerate the motor, movement of the master controller should be continued in the same direction, thereby successively bringing the contact segments 23$^a$, 24$^a$ and 25$^a$ into engagement with their corresponding contact fingers. Engagement of the contact segment 23$^a$ with the contact finger 23 establishes a circuit from contact segment 19$^a$ to contact finger 23, by conductors 55 and 56, through the operating winding of switch 3, thence by conductors 57 and 58, to conductor 52, and thence to the D. C. main line 13 as already traced. Thereupon the switch 3 closes, thereby shortcircuiting the resistance sections $r^2$ from the rotor circuit. Engagement of the contact segment 24$^a$ with the contact finger 24 completes a circuit from said contact finger 24, by conductor 59, through the operating winding of resistance switch 2 to conductor 57. Thereupon the switch 2 closes, shortcircuiting the resistance sections $r'$ from the rotor circuit. Engagement of contact segment 25$^a$ with contact finger 25 establishes a circuit from said contact finger 25, by conductor 60, through the operating winding of resistance switch 1, to conductor 57. Thereupon the switch 1 closes and shortcircuits the resistance sections $r$ from the rotor circuit. Gradual removal of the resistances $r$, $r'$ and $r^2$ in the manner set forth causes the motor to be gradually accelerated until brought up to normal speed. Of course, in practice, suitable relays might be provided for governing the acceleration of the motor. If at any time, while the motor is in operation, there is a failure of voltage in the alternating current supply circuit, or, in other words, in the motor circuit, the winding of the switch 30 would become deënergized and said switch fall to open position. This would result in interruption of the circuit between contact finger 21 and the windings of switches 4, 5 and 6. This, in turn, would cause the motor circuit to be opened, the resistance sections to be inserted in the rotor circuit, and the mechanical brake to be applied through the interruption of circuit through auxiliary contact of switch 5.

In practice, means would be provided for preventing the reënergization of the several switches until the master controller had been returned to initial position, but such means has been omitted to simplify the circuit connections. To stop the motor at any time, it is only necessary to move the master controller back to initial position which results first in gradually reinserting the resistances in the rotor circuit by successive deënergization of the switches 1, 2 and 3, then in the deënergization of the switches 4, 5 and 6 to disconnect the stator from circuit, and finally in the deënergization of the brake magnet 32 to cause the application of the mechanical brake 31. If, upon opening the motor circuit in the manner just described, the rotor continues to operate under the impetus acquired by its load, then the motor may be quickly brought to rest by causing the same to act as a dynamic brake in the following manner: To accomplish this result, the master switch should be moved in the direction opposite to that previously set forth for starting purposes. The initial movement of the controller in this direction causes all of the contact segments $20^b$, $22^b$, $23^b$, $24^b$ and $25^b$ to engage their respective contact fingers. This results first in establishing a circuit to contact segment $19^a$, as already traced, thence to contact segment $22^b$ and contact finger 22, by conductor 62, through the operating windings of switches 10 and 11 in parallel to D. C. main line 13. Thereupon the switches 10 and 11 close, thereby connecting the stator winding directly across the direct current supply circuit. More specifically, circuit is then closed from D. C. supply line 12, through the switch 10, by conductor 47, through the stator, by conductor 45, through switch 11 to D. C. supply line 13. The connection of the stator windings across the direct current supply circuit establishes a stationary field, and the motor thus becomes a separately excited A. C. generator and can be used to retard further rotation, or, in other words, causes the rotor, when operated, to generate a dynamic braking current.

Immediately upon closure of switch 10 the auxiliary switch 15 thereof closes and again completes the circuit of the brake coil 32. This circuit may be traced from contact segment $19^a$ of the master controller to contact finger 20, thence by conductor 49 through the coil 32, by conductors 50 and 51, through said auxiliary switch 15 and conductor 54 to D. C. main line 13. Hence, the mechanical brake is withdrawn as soon as connections are established for causing the motor to act as a dynamic brake. Also upon initial movement of the master controller and as soon as the auxiliary switch 15 of the switch 10 is closed, circuit is closed by the contact segments $23^b$, $24^b$ and $25^b$ through the operating windings of resistance switches 1, 2 and 3 in parallel as previously traced, and by conductors 58 and 52 through the auxiliary switch 15 to D. C. main line 13. Consequently, upon the establishment of circuit connections for dynamic braking, the switches 1, 2 and 3 respond, thereby short-circuiting all resistance in the rotor circuit. With all the resistance removed from the rotor circuit, a very strong dynamic braking effect is produced which will quickly bring the motor to rest. Assuming, now, that the motor is used for hoisting, and it is desired to cause the same to operate as a dynamic brake for retarding the descent of the load, it may be desirable to permit the load to descend more rapidly than will be permitted if all resistance is removed from the rotor circuit. It is well understood by those skilled in the art that by increasing the resistance in the dynamic braking circuit, the motor will be permitted to accelerate. With the arrangement illustrated, if it is so desired to allow the motor to accelerate, movement of the master controller should be continued in the same direction. This results in first disengaging the contact segment $25^b$ from the contact finger 25, which causes the deënergization of resistance switch 1. This, in turn, results in inserting the resistance sections $r$ in the rotor circuit, thereby reducing the dynamic braking effect and allowing the rotor to operate at a greater speed. If a still greater speed is desired, then the master controller may be moved to disengage the contact segment $24^b$ from the contact finger 24, which results in deënergization of the resistance switch 2. This causes the insertion of the resistance sections $r'$ in the rotor circuit to still further reduce the dynamic braking effect. So, likewise, movement of the master controller to disengage the contact segment $23^b$ from the contact finger 23 causes deënergization of the resistance switch 3 to insert the resistance sections $r^2$ in the rotor circuit, thereby permitting the load to descend with a still greater speed. As the load approaches the lower limit of its travel, it is, of course, desirable to check the speed thereof, and this can be accomplished by simply moving the drum in the opposite direction to cause successive energization of switches 3, 2 and 1 until the full dynamic braking effect is obtained. When the load has been brought to rest, or substantially to rest, the controller may be moved to the position illustrated in the drawing to deënergize the brake coil 32, thereby causing application of the mechanical brake 31. The switches for connecting the motor to the D. C. supply circuit are not in anywise controlled by the relay switch and, consequently, failure of voltage in the A. C. supply circuit would not interfere with the dynamic braking connections.

Having thus described my invention, what I desire to secure by Letters Patent, is:

1. In a controller for alternating current motors, in combination, electroresponsive switches for connecting the stator of the motor to an alternating current supply circuit for running, or to a direct current supply circuit for dynamic braking, a master switch controlling said electroresponsive switches, and means for insuring disconnection of the motor from one supply circuit prior to connection to the other supply circuit.

2. In a controller for alternating current motors, in combination, means for connecting the stator of the motor to an alternating current supply circuit for running, means for connecting the stator to a source of direct current supply for dynamic braking, a mechanical brake, and automatic operating means therefor interlocked with said first two mentioned means to withdraw said brake when the motor is connected to either supply circuit and to cause said brake to be applied whenever the motor is disconnected from circuit.

3. In a controller for alternating current motors, in combination, means for connecting the stator of the motor to an alternating current supply circuit for running, means for connecting the stator to a direct current supply circuit for dynamic braking, a mechanical brake, and an electroresponsive controlling winding for said brake, said winding being controlled by both of said connecting means to withdraw said brake when the motor is connected to either supply circuit and to cause said brake to be applied when the motor is disconnected from circuit.

4. In a controller for alternating current motors, in combination, means for connecting the stator of the motor to a source of alternating current for running, means for connecting the same to a source of direct current for dynamic braking, a mechanical brake arranged to be automatically applied upon disconnection of the motor from circuit, and means adapted, upon failure of voltage in the alternating current circuit, to cause said first mentioned means to disconnect the motor from circuit.

5. In a controller for alternating current motors, in combination, electroresponsive switches for connecting the stator of the motor to an alternating current supply circuit for running, electroresponsive switches for connecting the stator of the motor to a direct current supply circuit for dynamic braking, a master switch for controlling said first mentioned switches, a mechanical brake, an electroresponsive winding for withdrawing said brake, circuit connections whereby said winding is deënergized when the motor is disconnected from circuit, and a relay switch adapted, upon failure of voltage in the alternating current supply circuit, to cause the deënergization of said first mentioned electroresponsive switches, thereby disconnecting the motor from circuit and causing the application of the mechanical brake.

6. In a controller for alternating current motors, in combination, electroresponsive switches for connecting the stator of the motor to a source of alternating current for running electroresponsive switches for connecting the stator to a source of direct current for dynamic braking, the operating windings of said switches being supplied from the source of direct current, a master switch controlling said electroresponsive switches, and an electroresponsive relay switch having its operating winding connected to the source of alternating current and adapted, upon failure of voltage therein, to cause the operating windings of said first mentioned set of electroresponsive switches to be disconnected from the source of direct current, thereby causing said switches to disconnect the motor from the source of alternating current.

7. In a controller for alternating current motors, in combination, electroresponsive switches for connecting the stator of the motor to a source of alternating current for running, or to a source of direct current for dynamic braking, variable resistances connected in the rotor circuit, electroresponsive switches for varying said resistances, and a master switch for controlling said first mentioned switches to connect the stator to either source of supply, and to control said resistance switches to accelerate the motor or to regulate the dynamic braking action thereof.

In witness whereof, I have hereunto subscribed my name in the presence of two witnesses.

CLARK T. HENDERSON.

Witnesses:
FRANK H. HUBBARD,
S. W. FITZ GERALD.